US010645127B1

(12) United States Patent
Potts et al.

(10) Patent No.: US 10,645,127 B1
(45) Date of Patent: May 5, 2020

(54) SYSTEM AND METHOD FOR VIRTUAL BRIEFING BOOKS

(71) Applicant: JPMorgan Chase Bank, N.A., New York, NY (US)

(72) Inventors: Joel Potts, London (GB); Omar Siddiqi, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 257 days.

(21) Appl. No.: 14/086,093

(22) Filed: Nov. 21, 2013

Related U.S. Application Data

(60) Provisional application No. 61/829,211, filed on May 30, 2013.

(51) Int. Cl.
*G06F 3/0482* (2013.01)
*H04L 29/06* (2006.01)
*H04L 29/08* (2006.01)

(52) U.S. Cl.
CPC ............ *H04L 65/403* (2013.01); *H04L 67/10* (2013.01); *G06F 3/0482* (2013.01)

(58) Field of Classification Search
CPC ...................... G06F 3/048–0488; G06Q 50/01
See application file for complete search history.

(56) References Cited

U.S. PATENT DOCUMENTS

| | | | | |
|---|---|---|---|---|
| 5,165,012 A * | 11/1992 | Crandall | ............ | G06Q 10/109 345/618 |
| 6,662,195 B1 * | 12/2003 | Langseth | ............ | G06F 16/283 |
| 7,010,681 B1 * | 3/2006 | Fletcher | ............ | H04L 63/0428 713/154 |
| 8,832,301 B2 * | 9/2014 | Graff | ................ | G06Q 10/1093 709/231 |
| 9,208,177 B2 * | 12/2015 | Petrou | ................ | G06K 9/00288 |
| 9,723,035 B1 * | 8/2017 | Siddiqui | ............... | H04L 65/403 |
| 2003/0078973 A1 * | 4/2003 | Przekop | ................ | G06Q 10/10 709/204 |

(Continued)

OTHER PUBLICATIONS

SearchMobileComputing.com definition entry for "zipping", dated Sep. 12, 2010 per Internet Archive Wayback Machine capture, retrieved from http://web.archive.org/web/20100912011627/http://searchmobilecomputing.techtarget.com/definition/zipping.*

(Continued)

*Primary Examiner* — Dino Kujundzic
(74) *Attorney, Agent, or Firm* — Greenblum & Bernstein, P.L.C.

(57) ABSTRACT

The invention is generally directed to a system and method providing a software application that can run on portable or wearable computing devices that allows for the creation and display of a virtual briefing book, for example, providing a list of attendees for a conference or other event, their photographs, and titles or other background information. According to one embodiment, the software application displays a list of briefing book files corresponding to different conferences or events that an executive or other user may attend. The user can select a briefing book and it will display pictures and background on the attendees expected for the conference. The user can access photographs, names, and other information about the attendees on-site and in a fairly discreet manner that greatly improves over conventional hard copy briefing books.

19 Claims, 16 Drawing Sheets

(56) References Cited

U.S. PATENT DOCUMENTS

| | | | | |
|---|---|---|---|---|
| 2005/0222890 | A1* | 10/2005 | Cheng | G06Q 10/109 705/7.19 |
| 2007/0016661 | A1* | 1/2007 | Malik | G06Q 10/109 709/223 |
| 2007/0250372 | A1* | 10/2007 | Arbouzov | G06Q 10/10 709/219 |
| 2008/0114712 | A1* | 5/2008 | Gleim et al. | 706/47 |
| 2008/0294899 | A1* | 11/2008 | Gazzetta | G06F 21/6218 713/170 |
| 2009/0141138 | A1* | 6/2009 | DeAngelis | G06F 16/58 348/220.1 |
| 2010/0088372 | A1* | 4/2010 | Shridhar | G06F 21/41 709/204 |
| 2010/0185933 | A1* | 7/2010 | Coffman | G06Q 10/10 715/230 |
| 2010/0287112 | A1* | 11/2010 | Hawkins | 705/345 |
| 2011/0202469 | A1* | 8/2011 | Venkateswaran | G06F 3/0486 705/301 |
| 2012/0036181 | A1* | 2/2012 | Isidore | G06Q 50/01 709/203 |
| 2012/0249797 | A1* | 10/2012 | Haddick | G06F 1/163 348/158 |
| 2012/0329475 | A1* | 12/2012 | Ribaudo et al. | 455/456.1 |
| 2013/0044130 | A1* | 2/2013 | Geisner et al. | 345/633 |
| 2013/0238392 | A1* | 9/2013 | Sloan | G06Q 30/0201 705/7.29 |
| 2013/0305160 | A1* | 11/2013 | Gingras et al. | 715/738 |
| 2014/0025747 | A1* | 1/2014 | Sarkar | H04W 4/21 709/204 |
| 2014/0101248 | A1* | 4/2014 | Felder | H04L 67/20 709/204 |
| 2015/0127636 | A1* | 5/2015 | Hofstetter | G06Q 10/10 707/722 |

OTHER PUBLICATIONS

Evernote, "Evernote Business Walkthrough," published on Apr. 10, 2013 by YouTube.com, available at https://www.youtube.com/watch?v=8RzawHfJviM, length: 7 minutes and 12 seconds. (Year: 2013).*

* cited by examiner

Figure 11
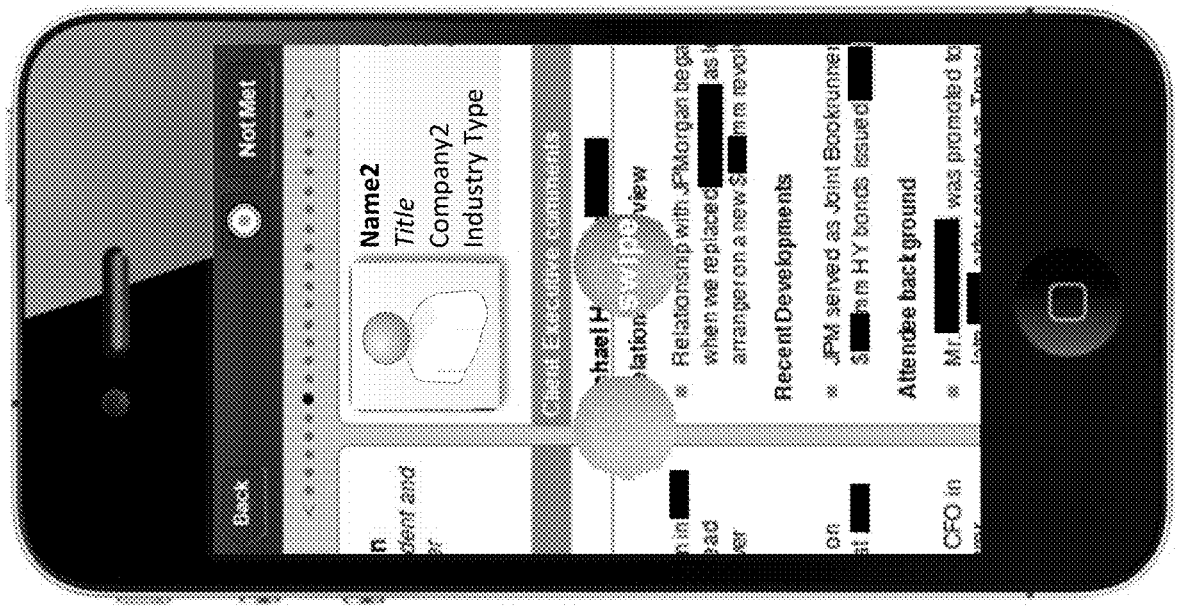
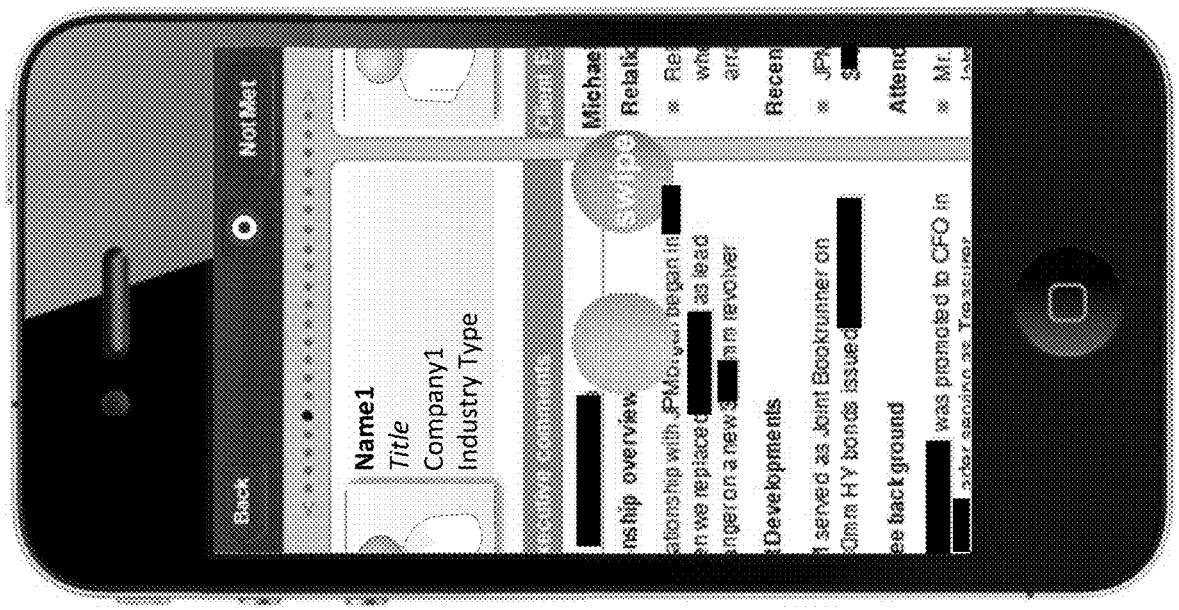

SYSTEM AND METHOD FOR VIRTUAL BRIEFING BOOKS

CROSS-REFERENCE TO RELATED APPLICATION(S)

The present application claims priority to U.S. Provisional Patent Application No. 61/829,211, filed May 30, 2013, which is incorporated herein by reference in its entirety.

FIELD OF THE INVENTION

The present invention relates generally to conferences and other business-related meetings or events, and more particularly, to a system and method for providing a portable virtual briefing book for use in conference and other business-related meetings and events.

BACKGROUND OF THE INVENTION

Executives and other employees of a company (or other public or private enterprise) often attend seminars and other trade or industry conferences to stay abreast of market developments, legal/regulatory requirements, and the like. Another important aspect of seminars and conferences is for executives to network in order to establish new relationships and maintain existing ones with clients, customers, vendors/suppliers, and even competitors.

It is common that executives attending a conference (e.g., health care conference) will have a hard copy briefing book prepared ahead of time. The hard copy briefing book typically identifies attendees of interest (or in some cases, all attendees) and their backgrounds. FIG. 1 shows two pages of a conventional briefing book in a spiral-bound hard copy. Such conventional briefing books are typically created by filling in Microsoft® Word® documents based on preset templates and then printed out as hard copies. Such hard copy briefing books have numerous drawbacks and disadvantages. They are difficult to create and difficult to use. Hard copy briefing books can be 150-200 pages or more. Thus, they are costly in terms of the time and cost required to create them. Typically, an executive will study the briefing book before the conference but not bring it into the conference. As a practical matter, briefing books often cannot be carried around and used by the executive during a conference. They are just too unwieldy. Even shorter/lighter briefing books are not likely to be carried and used in a mobile fashion because effective networking is not usually served by comparing pictures in a book to attendees in a manner that calls attention to what the user is doing.

Hard copy briefing books are often disposed of following conferences. In that regard, they tend to be one-use-only products. Thus, they are not only expensive to create in the first place, but that investment is essentially lost since the book will not be reused.

What is needed is a system and method for a briefing book that more effective, less costly, and that has a range of features that overcome at least some of the problems and drawbacks in the prior art.

Other problems and drawbacks also exist.

SUMMARY OF THE INVENTION

The invention is generally directed to a system and method for providing a software application (sometimes referred to herein as an "app" or "App") that can run on portable computing devices (e.g., an Apple iPad, as well as other tablets, notebooks, laptops, netbooks, smart phones, mobile devices, etc.) to allow for the creation and display of a virtual briefing book, for example, by providing a list of attendees for a conference or seminar, their pictures, and titles or other background information. Portable computing devices may be referred to hereinafter as "portable devices" and are understood to encompass mobile devices. The app that executes on portable devices according to the invention is sometimes referred to herein as the "iNetwork App" or "Briefing Book App".

According to one embodiment, the iNetwork App displays a list of briefing book files corresponding to different conferences or events that an executive or other user may attend. The user can select a briefing book and it will display pictures and background on the attendees expected for the conference. In one embodiment, a photo-grid view (quasi-thumbnails) displays pictures of nine (9) to twelve (12) attendees with basic information, such as their names and titles. According to another aspect of the invention, thumbnails can be annotated with icons or other graphic markers to mark certain attendees as targets, leads, or the like that the executive should meet or otherwise engage.

According to another aspect of the invention, the user can click on a thumbnail or other picture to get an expanded-view description of an attendee. By way of example, the expanded view could state: "Stephen L. Harrison, CEO National Health Group: Joined NHG in 1994 and became CEO in 2008. Previously at Arthur Andersen, where he was CFO. 1974 graduate of Fordham University. Children are Tommy (21) and Kathleen (17). Hobbies are sailing and 19th century luminist/tonalist art)." The expanded view may also include marketing strategy notes or other notes to guide the interaction, e.g., "S. Harrison has stated an interest in NHG acquiring a health care transaction processor company. Explore that and other potential deals. Discuss firm advisory services and how they can help NHG").

According to yet another aspect of the invention, the iNetwork App may also allow the user to enter his/her own notes, such as after meeting a target, e.g., "Met with S. Harrison of NHG. Seems interested in our advisory services although currently using Alaska Bank, N.A. exclusively. Suggested that we make an appointment with Exec. VP Shirley Smith in London."). According to yet another aspect of the invention, a briefing book file annotated with such notes can be uploaded to a central server after a conference to allow for appropriate follow-ups.

The invention allows a user to bring a virtual briefing book with him/her during a conference (or other group meeting, including a golf outing, dinner, box seats at a game, etc.). In some cases, an executive might have an assistant who discreetly consults the virtual briefing book to keep the executive updated on attendees of interest. According to some embodiments, the content of a virtual briefing book may be updated in real-time, for example, with latest news about the attendees and market information concerning their respective organizations.

Information recorded in the iNetwork app might be assigned security criteria (e.g., "material nonpublic information," "nonmaterial nonpublic information," "internal competition sensitive information") so that compliance/regulatory rules are satisfied and access is limited to appropriate personnel. For example, the CEO may be able to access all available information about Stephen Harrison, whereas a lower level executive might not be able to view personal information like family members and hobbies.

Accordingly, it is one object of the present invention to overcome one or more of the aforementioned and other limitations of existing approaches to attending conferences.

It is another object of the invention to provide systems and methods for a virtual briefing book that can be accessed discreetly relative to conventional hard copy briefing books.

It is yet another object of the invention to provide systems and methods for a virtual briefing book that can be hosted on a portable computing device.

It is still another object of the invention to provide systems and methods for a virtual briefing book that can be annotated and otherwise updated.

Embodiments of the present invention may produce the technical effect of digitizing briefing book content and making briefing books electronically accessible on portable computing devices. Another technical effect may be the centralized organization and management of briefing book materials to facilitate convenient reuse and continuous tracking of information concerning marketing targets. Yet another technical effect may be the dynamic editing and/or updating of an electronic briefing book in a mobile computing environment.

The accompanying drawings are included to provide a further understanding of the invention and are incorporated in and constitute part of this specification, which illustrate several embodiments of the invention and, together with the description, serve to explain the principles of the invention. It will become apparent from the drawings and detailed description that other objects, advantages and benefits of the invention also exist.

BRIEF DESCRIPTION OF THE DRAWINGS/EXHIBITS

The purpose and advantages of the present invention will be apparent to those of skill in the art from the following detailed description in conjunction with the appended drawings in which like reference characters are used to indicate like elements.

FIGS. 4-13 show exemplary screen shots of an iNetwork virtual briefing book mobile app according to one embodiment of the invention.

DETAILED DESCRIPTION OF THE INVENTION

Figure 1:
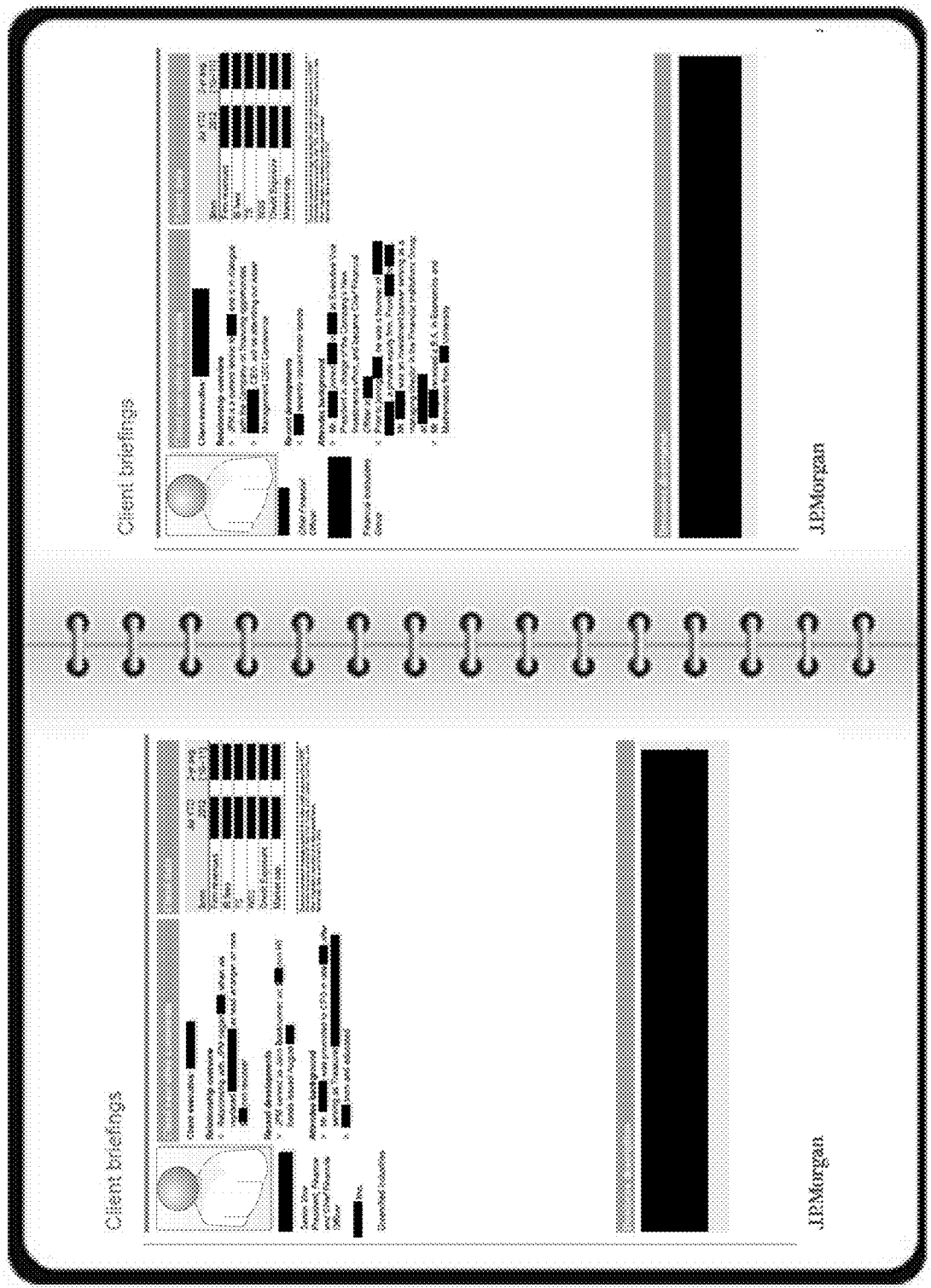
FIG. 1 shows a conventional briefing book in a spiral-bound hard copy.

The invention is generally directed to a system and method for providing and using virtual briefing books. A software application (sometimes referred to herein as an "app" or "App") may be installed on portable computing devices (e.g., an Apple iPad, Samsung Galaxy, Google Nexus, as well as other tablets, notebooks, laptops, netbooks, smart phones, mobile devices, etc.) to allow a user to access virtual briefing books. Each virtual briefing book may, for example, provide a list of attendees for a conference or seminar, their photographs, and titles or other background information. Portable computing devices may be referred to hereinafter as "portable devices" and are understood to encompass mobile devices. The app that executes on portable devices according to the invention is sometimes referred to herein as the "iNetwork App" or "Briefing Book App".

The iNetwork App may display a list of briefing book files corresponding to different conferences or events. The user can select a briefing book and it will display pictures and background on the attendees expected for the corresponding conference. The attendee entries, which may be displayed in thumbnail or tile format in the briefing book, can be annotated with icons or other graphic markers to mark certain attendees as targets, leads, or the like that the executive should meet or otherwise engage. The user can click on a thumbnail or other picture to get an expanded-view description of an attendee. The iNetwork App may also allow the user to enter his/her own notes, such as after meeting a target, comments on the first impression of the target, potential business opportunities revealed during the conversation, and any follow-up actions. A briefing book file annotated with such notes can be uploaded to a central server after a conference to allow for appropriate follow-ups.

The invention allows a user to bring a virtual briefing book with him/her during a conference (or other group meeting, including a golf outing, dinner, box seats at a game, etc.). In some cases, an executive might have an assistant who discreetly consults the virtual briefing book to keep the executive updated on attendees of interest.

According to one approach, prior to the conference a number of attendees are designated as targets or leads with specific goals for the interaction. As the user-attendee meets these people, he/she can change the status of an attendee from target to contact-made. Following the conference, this information can be uploaded or otherwise accessed to evaluate the success of the attendee in meeting the right people.

According to another aspect of the invention, the iNetwork app could include facial recognition technology so that a discreet camera shot could be processed to pull up the entry for a person. The iNetwork app could be integrated with a Google Glass™ device, or similar portable Internet-access technology, so that the attendee information could be viewed in a discreet manner as the user walks around.

Preferably, the Briefing Book App will be accessed as part of a so-called Private Ecosystem of apps accessible by a limited group of persons in an organization. Preferably, the Briefing Book App can interface with a central server of the organization to receive updates.

A related aspect of the invention, which could be used with the iNetwork app or independently, is an Intelligent Name Tag (INT). The technology behind name tags used in conferences and seminars has not changed for many decades. An INT tag could have text with one's name that could be read by an iNetwork-equipped mobile device. Alternatively, the name tag could have smart characteristics allowing for user control, such as an electronic display that could be turned on/off or that can have selective gray-outs (e.g., name is "Bill McCain", but the name of his organization and/or his title or position may be grayed out or turned off, or alternatively, even the name can be grayed out/turned off so that he can go completely "anonymous"). The INT could have RFID or other near-field technology (or bar code, QR code) so that it could be read by others' mobile devices to identify the person. The smart INT tag could be associated with an app that could be downloaded by attendees and placed on their mobile devices prior to the conference. The INT tag could even have GPS or like technology to allow individual persons to be tracked within the conference. The INT tag could allow for the exchange of business cards electronically (e.g., touching badges).

Figure 2:
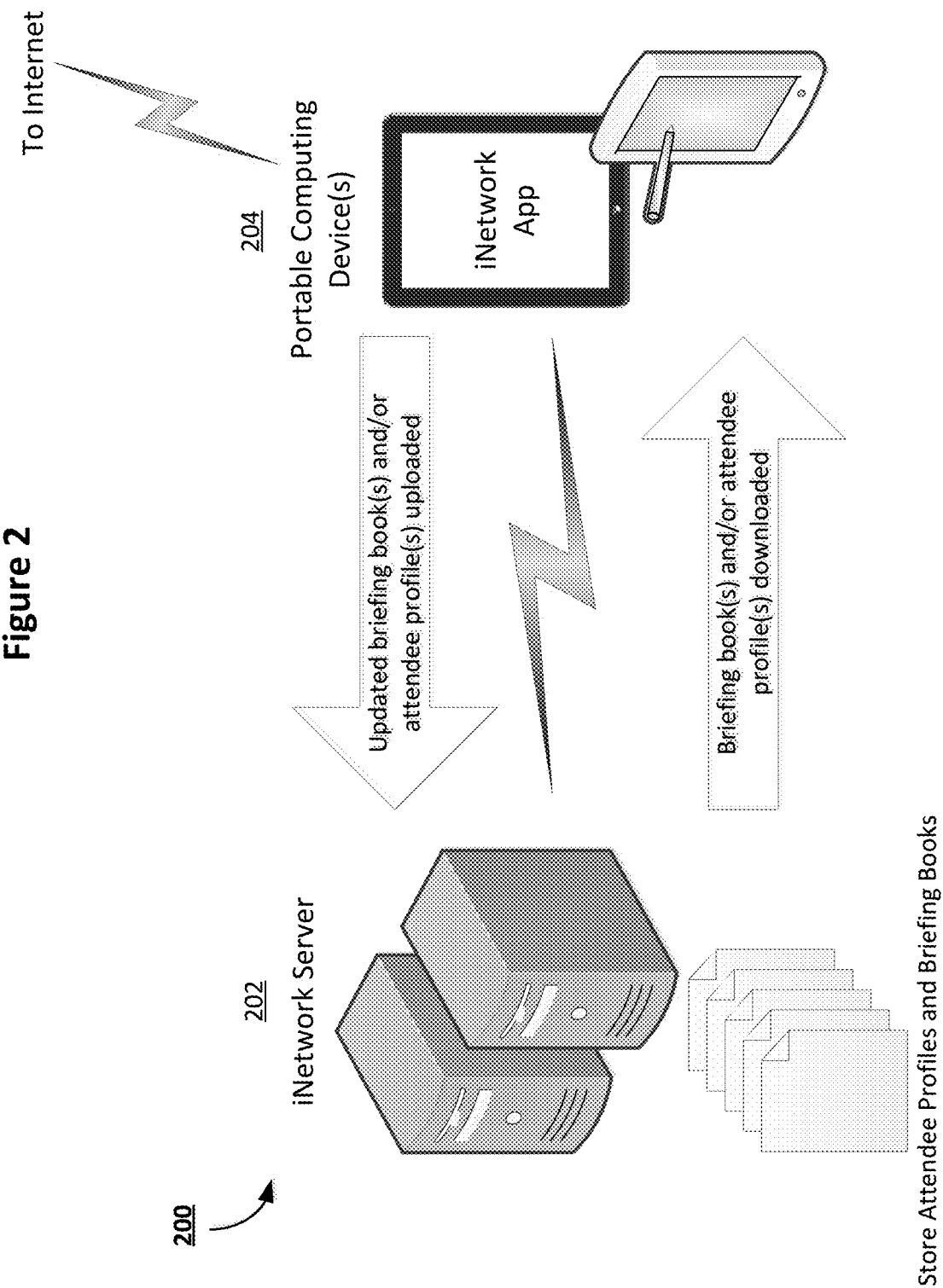
FIG. 2 is a block diagram illustrating an exemplary system for providing virtual briefing books according to one embodiment of the invention.

FIG. 2 is a block diagram illustrating an exemplary system 200 for providing virtual briefing books according to one embodiment of the invention. The system 200 may comprise a central server 202 (referred to herein as "iNetwork Server") and one or more portable computing devices 204.

As shown, the system 200 (and related software) is implemented based on computing equipment. Generally, it should be noted that the components depicted and described herein may be, or include, a computer or multiple computers. Although the components are sometimes shown as discrete units, they may be interconnected or combined. The components may be described in the general context of computer-executable instructions, such as program modules, being executed by a computer. Generally, program modules include routines, programs, objects, applications, components, data structures, etc., that perform particular tasks or implement particular abstract data types. For example, a server may comprise a single server or a group of servers used to service users. Additionally, a server may comprise a front-end web server and a back-end database server. Alternatively, those functions can be integrated into a single server device.

Those skilled in the art will appreciate that the invention may be practiced with various computer system configurations, including hand-held wireless devices such as mobile phones, tablets or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computing devices (e.g., mobile devices, lap-tops, desktops, etc.) typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or Apple iOS operating systems, Google Android operating system (and variations thereof), Microsoft Windows® operating system (desktop and/or mobile version), the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system or platform.

User applications may be so-called stand-alone applications executing on user devices or they may be client-server type applications that interface with server-side components. They may include applications provided by the server, such as Java Applets, that may be delivered with web pages.

The memory will include at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer may include a plurality of software processing modules stored in a memory as described herein and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, RUM and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, processor, CPU (Central Processing Unit), programmed micro-processor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It is appreciated that in order to practice the invention as described herein, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described herein is performed by various components and various memories. However, it is appreciated that the processing performed by two distinct components as described herein may, in accordance with a further embodiment of the invention, be performed by a single component. Further, the processing performed by one distinct component as described herein may be performed by two distinct components. In a similar manner, the memory storage performed by two distinct memory portions as described herein may, in accordance with a further embodiment of the invention, be performed by a single memory portion. Further, the memory storage performed by one distinct memory portion as described herein may be performed by two memory portions, for example.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. Input devices include those that recognize hand movements or gestures, such as in the case of gesture set supported by Android or the swipe movements recognized in iOS-based devices. These and other input devices are often connected to the processing unit through a user input interface that is coupled to the system bus, but may be connected by other interface and bus structures, such as a parallel port, game port or a universal serial bus (USB).

A user interface may include any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed herein, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the invention, it is not necessary that a human user actually interact with a user interface used by the processing machine of the invention. Rather, it is also contemplated that the user interface of the invention might interact, i.e., convey and receive information, with another processing machine, rather than a human user. Further, it is contemplated that a user interface utilized in the invention may interact partially with another processing machine or processing machines, while also interacting partially with a human user.

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described herein.

Various networks may be implemented in accordance with embodiments of the invention, including a wired or wireless local area network (LAN) and a wide area network (WAN), the Internet, wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism.

Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, Wi-Fi, 2G, 3G, Ultra-Wideband and Long Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Specifically, the iNetwork Server 202 may include at least one server computer typically configured as part of an enterprise network and connected to the Internet through a firewall. The iNetwork Server 202 may be store or have access to the personal and company profiles of a number of people such as employees, business contacts, and potential clients. Any of these people may potentially participate in future events such as conferences, trade shows, client meetings, employee offsites, charity functions, and so on. For ease of description, the collection of information (including personal and company profiles) for each of these people is referred to hereafter as an "attendee profile." The attendee profile typically includes the information such as name, photograph, title, company, comments from the Client Executive including relationship overview and personal background such as education and family, who invited the person to a current event, business description, and client company data etc.

According to one embodiment of the present invention, the iNetwork Server 202 may be interfaced with a customer/client relationship management (CRM) system and/or a social networking service with access to a database of people's personal and contact information among others. For example, the iNetwork Server 202 may be coupled to a LexisNexis® InterAction® CRM system, a Salesforce® CRM application, the LinkedIn® or Facebook® databases to retrieve information relevant to attendee profiles.

The iNetwork Server 202 may also store or have access to a number of draft and completed briefing books include those that have been used for previous conferences or other events. Each briefing book may include a number of attendee profiles to target persons likely to attend one particular event or a particular series of events.

The iNetwork Server 202 may further run a briefing book administrative application to manage the briefing books and control access thereto. For example, the briefing book administrative application may include functions similar to typical document management system (DMS) or share functional modules of a DMS such that the briefing books may be organized and stored in a document database for easy search and retrieval. Since the briefing books may contain non-public, sensitive information concerning attendees personally and their respective companies, it may be desirable to impose security measures to limit access to the briefing books. For instance, any access to the briefing books and/or attendee profiles may be subject to user authentication and restricted based on entitlement levels of the users requesting access.

The portable computing devices 204 may include mobile personal computers, such as tablets (e.g., Apple iPad or iPad Mini, Samsung Galaxy tablet, Google Nexus tablet, Amazon Kindle and Kindle Fire etc.), PDAs (personal digital assistants), smart phones (e.g., the Apple iPhones, Samsung Galaxy S series or Note series smart phones, etc.), netbooks, and other forms of portable computer devices. The portable computing devices 204 typically have less powerful processors and limited storage capabilities as compared to full-functioned personal computers. The portable computing devices 204 are preferably capable of network communications based on Wi-Fi or cellular network connections, so that they may exchange data with the iNetwork Server 202 and/or other networked devices on the Internet. According to embodiments of the present invention, a mobile application called "iNetwork App" may be installed to run on each of the portable computing devices 204. The iNetwork App may be mainly responsible for the display, editing, update, and management of virtual briefing books on the portable devices.

In operation, the iNetwork Server 202 may download briefing books and/or attendee profiles to the portable computing devices 204. For example, in advance of an upcoming conference or event, the iNetwork Server 202 may automatically transmit a virtual briefing book to the portable computing devices 204 of all the people authorized to receive the briefing book. Alternatively, a user may specifically request a briefing book to be downloaded from the server or run a synchronization to receive updated briefing books in batch. On a portable computing device 204, its user may update a briefing book by annotating or revising attendee profiles. Alternatively or additionally, the iNetwork App may receive updates to the briefing book or attendee profiles, for example, from CRM databases or other networked data sources. The updated briefing book and/or attendee profile(s) may be uploaded back to the iNetwork Server 202 either manually or automatically (e.g., as scheduled after the end of a conference or event).

Figure 3:
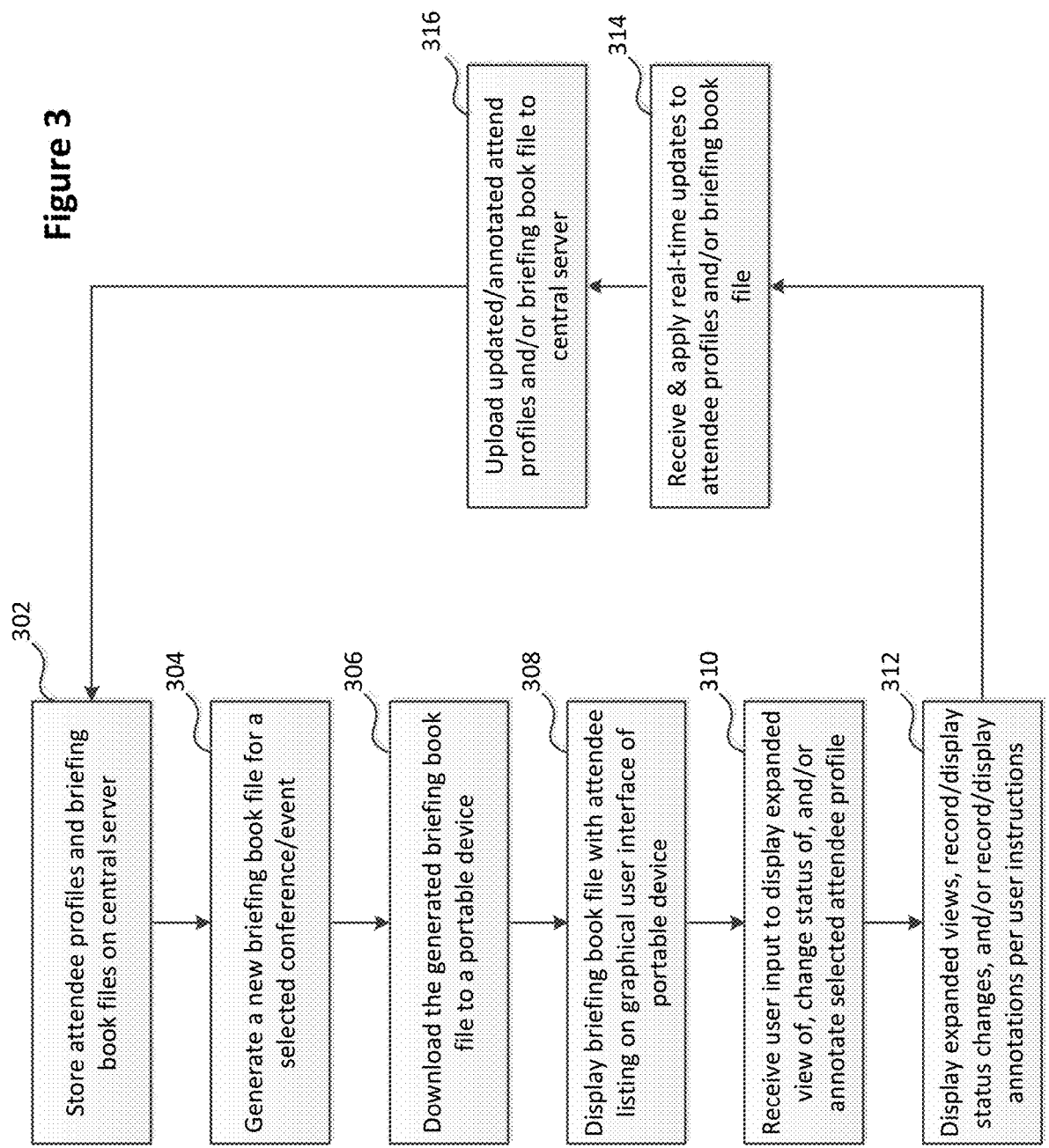
FIG. 3 is a flowchart illustrating an exemplary method for providing virtual briefing books according to one embodiment of the invention.

FIG. 3 is a flowchart illustrating an exemplary method for providing virtual briefing books according to one embodiment of the invention.

In Step 302, attendee profiles and/or briefing book files may be stored on (or accessed by) a central server. As mentioned above, information pertinent to the attendee profiles may be sourced from a number of databases or web services and could be updated periodically or at any time. The briefing books may include old ones previously prepared for past conferences or events as well as new or draft ones for upcoming events. The briefing books may use any of a variety of formats including but not limited to Word, PDF, HTML, or XML, for example. Some attendee information in the briefing books may be static (e.g., name, age, ethnic origin, and education etc.), while other information may be dynamic and could be updated from time to time (e.g., current title, affiliation, company information, and news etc.).

In Step 304, a briefing book file may be generated for a particular conference or event. The new briefing book may be generated upon a user request entered via a briefing book administrative application. Alternatively, the generation of a new briefing book may be pre-scheduled, for example, 2-3 weeks before the date of an annual conference or trade show. The new briefing book may be prepared based on old briefing books previously generated for the same or similar event and therefore re-use attendee profiles to the extent possible. The preparation of the new briefing book may be substantially automated. For instance, a user might only need to identify the conference, select attendee profiles (or enter attendee information, where necessary), and specify a desired briefing book format/style (if not using a default format/style), whereupon the new briefing book could be automatically assembled based on the user's inputs and preferences.

In Step 306, the newly generated briefing book (or another one) may be downloaded to a portable computing device. According to some embodiments of the present invention, a draft or finalized briefing book for an upcoming event may be automatically distributed to a group of designated users (e.g., executives) what are expected to attend the event. For example, each of the executives' portable computing devices may include a designated briefing book folder whose content could be synchronized with briefing book files authorized for the particular user. Typically, the briefing books are permissioned on a per user basis where each user gets a custom data download for their eyes only. Each briefing book may be a single file (e.g., a Word or PDF document) or a binder of files (e.g., an HTML or XML file with components thereof). For security, the communications between the central server and the portable computing device may be encrypted, for example, with data transmitted over an HTTPS or other secure connections. The briefing book file(s) on the portable computing device may also be fully encrypted.

In Step 308, the briefing book file may be displayed on a graphical user interface (GUI) of the portable computing device. All the briefing books available on the portable device may be displayed alphabetically or by folder or category. Upon user selection, one of the available briefing books may be displayed by listing out its attendee profiles.

In Step 310, the portable device may receive user input to display expanded view of, change status of, and/or annotate selected attendee profile(s). When the briefing book is first opened, the attendee profiles in the initial listing may be in abbreviated or icon format where each attendee profile, upon selection, may be further expanded into a more detailed display of the attendee information. Each attendee in a briefing book may be assigned at least one status. For example, decision-makers of a client company may be considered more important for marketing purposes than other less significant attendees and may be marked as "targets" so that they may be purposefully engaged during the upcoming event. According to one embodiment, additional information may be included with attendees who have been identified as "targets." For example, in a "target" attendee profile, there may be included information describing the target's importance, conversation topics of the most interest to him/her, suggested follow-up tactics, and so on. At the event, after the user of the briefing book has approached and spoken with a targeted attendee, the user may change the attendee's status from "target" to "contact made" in the iNetwork App. The user may also annotate an attendee's profile before, during, and/or after a conversation with that particular attendee. For example, the annotation may include the user's comments on the attendee profile, impressions from the conversation, scheduling of a follow-on meeting, and any other information. The annotation may also include instructions for corrections or updates to the attendee profile, or alternatively the user may be allowed to correct or update the attendee profile directly within the virtual briefing book displayed on the portable device.

In Step 314, real-time updates may be automatically received and applied to the attendee profiles and/or briefing book file. For example, for the dynamic content in attendee profiles such as the latest stock quotes and breaking news of attendees' companies may be updated in real-time when the briefing book is displayed on the portable device. As one example, live RSS news feeds and Twitter updates could significantly enhance the attendee profiles especially where a targeted attendee is a celebrity or his/her company is in the media spotlight.

In Step 316, any updated or annotated attendee profiles and/or briefing book file may be uploaded to the central server (e.g., iNetwork Server) to replace or update the attendee profiles and briefing books stored therein. According to one embodiment, the upload could be performed as soon as an attendee profile or briefing book file is revised or annotated during an event such that any new information may be immediately shared with colleagues who rely on the same briefing book at the event. Alternatively, each user's updates may be collected or uploaded after the conclusion of the event.

With the exemplary method shown in FIG. 3, virtual briefing books could be conveniently placed "in your pocket" (i.e., onto a mobile device) and allow entries to be browsed and administered using a web-based administration tool. There is no longer a need to carry any hard copy of briefing book around during a conference or other event.

FIGS. 4-13 show exemplary screen shots of an iNetwork virtual briefing book mobile app according to one embodiment of the invention. Although all the screen shots are shown on an Apple iPhone or iPad interface, it should be noted that the iNetwork App is not limited to Apple iOS devices and may be implemented on other portable computing devices such as Android-, Windows-, or BlackBerry-based smart phones and/or tablet computers.

Figure 4:
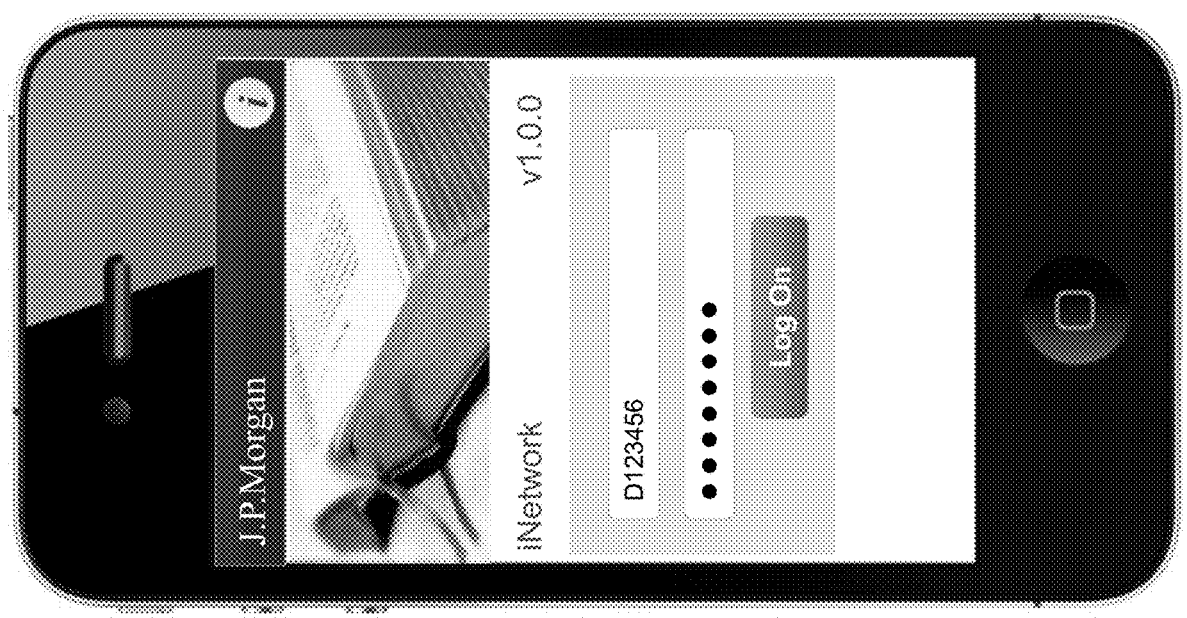

FIG. 4 shows how the iNetwork application can be accessed using a mobile device (e.g., smart phone) with appropriate log-in credentials (e.g., user name and password).

Figure 5:
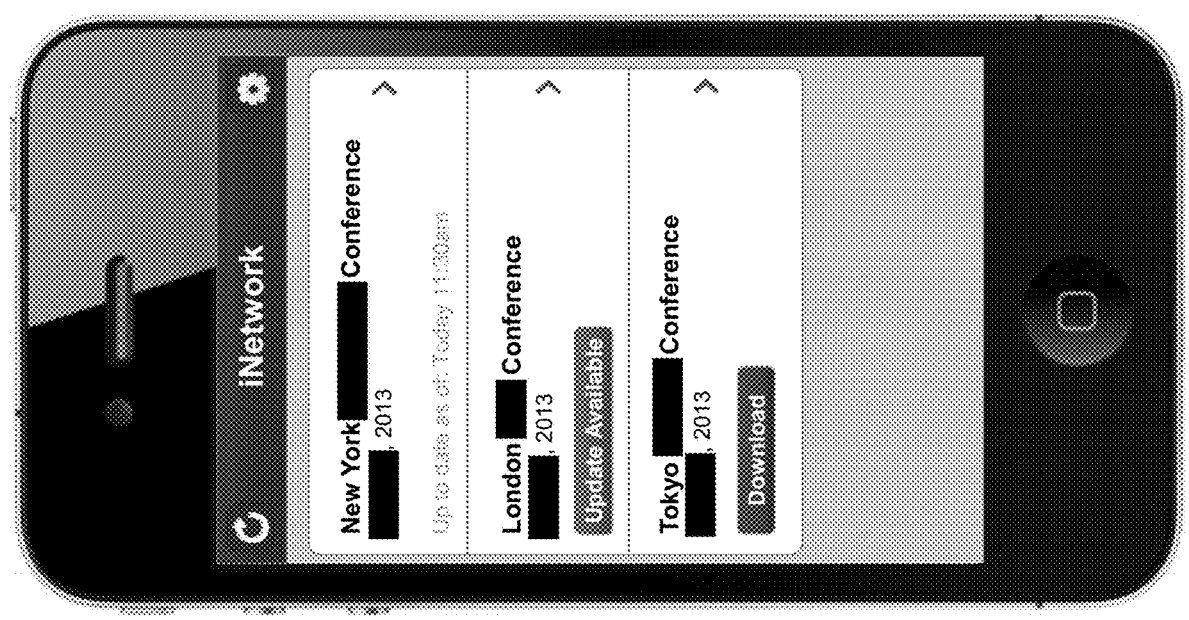

FIG. 5 shows an exemplary user interface of the iNetwork application providing a list of virtual briefing books for three (3) conferences. In this manner, the user can see a list of conferences and select specific virtual briefing books to prepare for and attend a conference.

Figure 6:
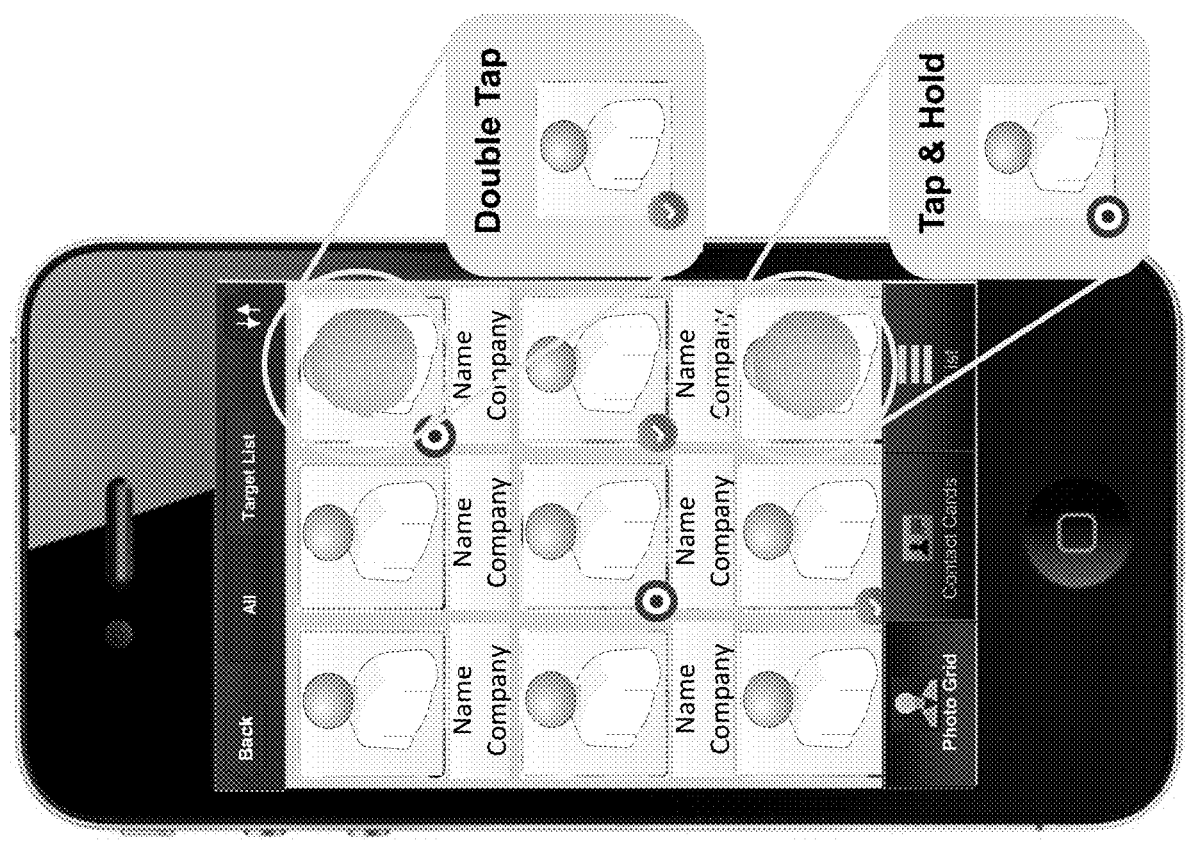

FIG. 6 shows a photo-grid of nine (9) or twelve (12) thumbnail type photographs of persons in the briefing book along with basic information, such as name and title/affiliation. A toolbar may be provided, for example, along the bottom of the user interface, providing for selecting among different display formats, including the photo grid of FIG. 6, a "contact card" format, or a "list" format. Furthermore, the target symbols placed in the lower left corner of a photograph indicates that attendee's status as "target." On the iPhone touch screen, tapping and holding an attendee icon may change its status to "target" (see the attendee entry in the lower right corner on FIG. 6). For an attendee that has already been designated as a target (see the attendee entry in the top right corner on FIG. 6), a double tap on that attendee icon may change its status from "target" to "contact made" (note the change of symbol from target to checkmark).

Figure 7:
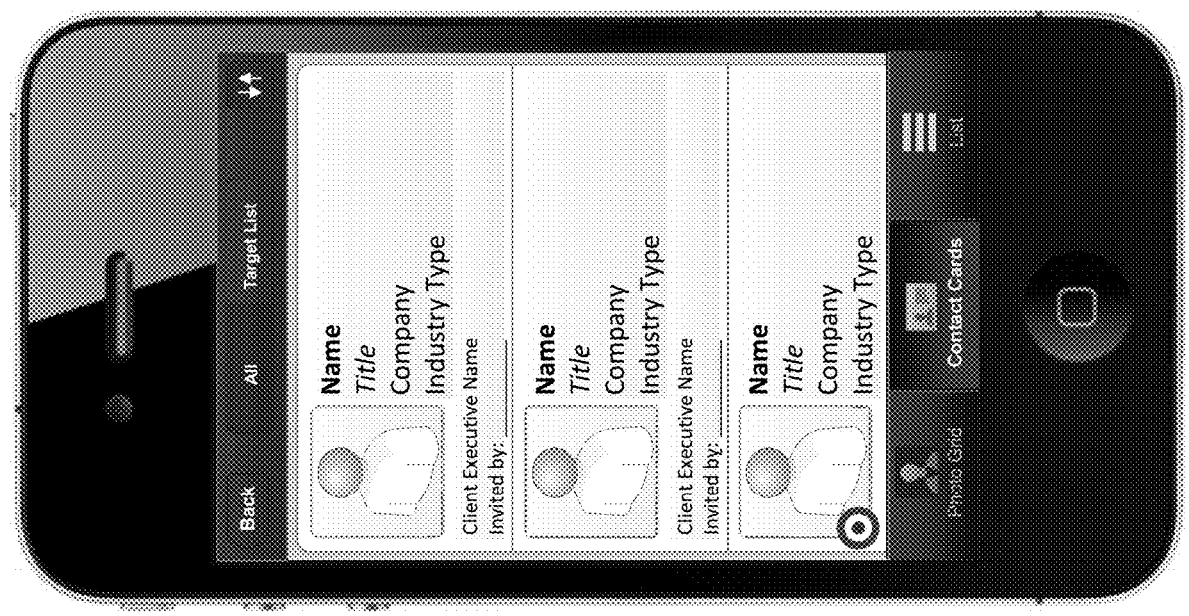

FIG. 7 shows the "Contact Card View" of the briefing book displayed on the iPhone screen where each attendee's contact card shows the photograph, name, title, company, and industry type. Also displayed under the contact card is the client executive name and by whom the attendee was invited. Those targeted attendees are clearly marked with target symbols. In this or other views of the briefing book, the user may employ gestures to manipulate the display size and layout (e.g., pinch fingertips to zoom out or spread fingertips to zoom in).

Figure 8:
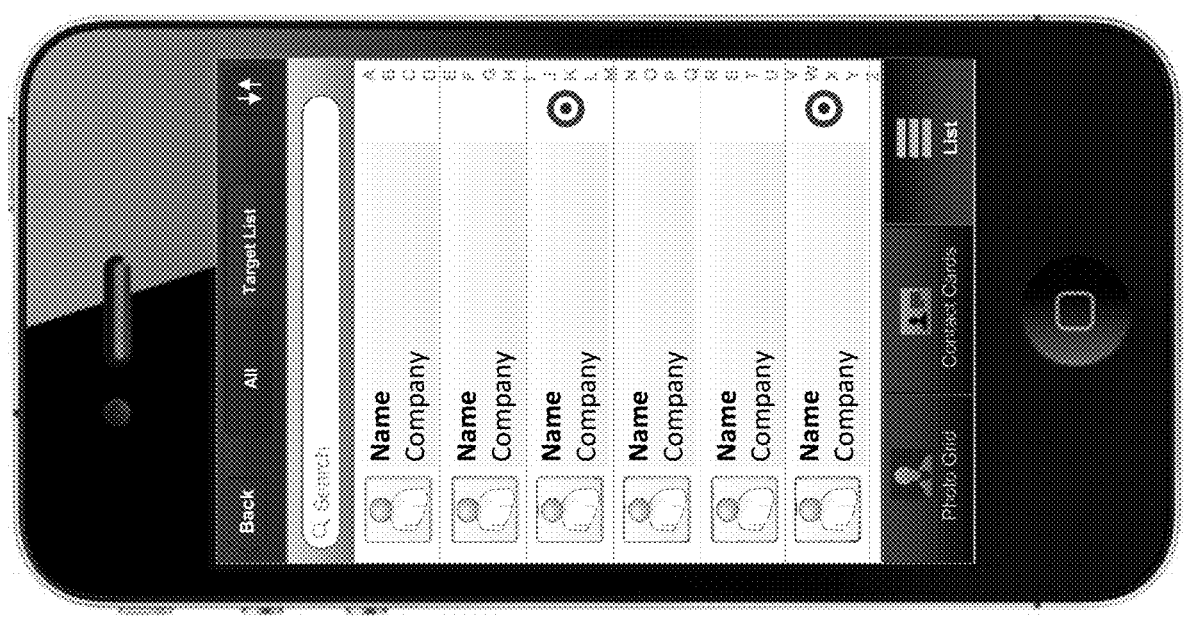

FIG. 8 shows the "List View" of the briefing book displayed on the iPhone screen. A list format of attendees with small thumbnail size photos and affiliation information is presented for user selection. A device with a larger screen size, such as a Samsung Galaxy III or IV, is expected to allow for display of even more names. The attendee list may be sorted alphabetically and an alphabet along the right edge of the screen allows a quick search and browsing in the list. The iNetwork App can also support sorting of the attendees within or across briefing books, for example, alphabetically based on first name, last name, or company name etc. In the "List View," those targeted attendees are again clearly marked with target symbols.

Figure 9:
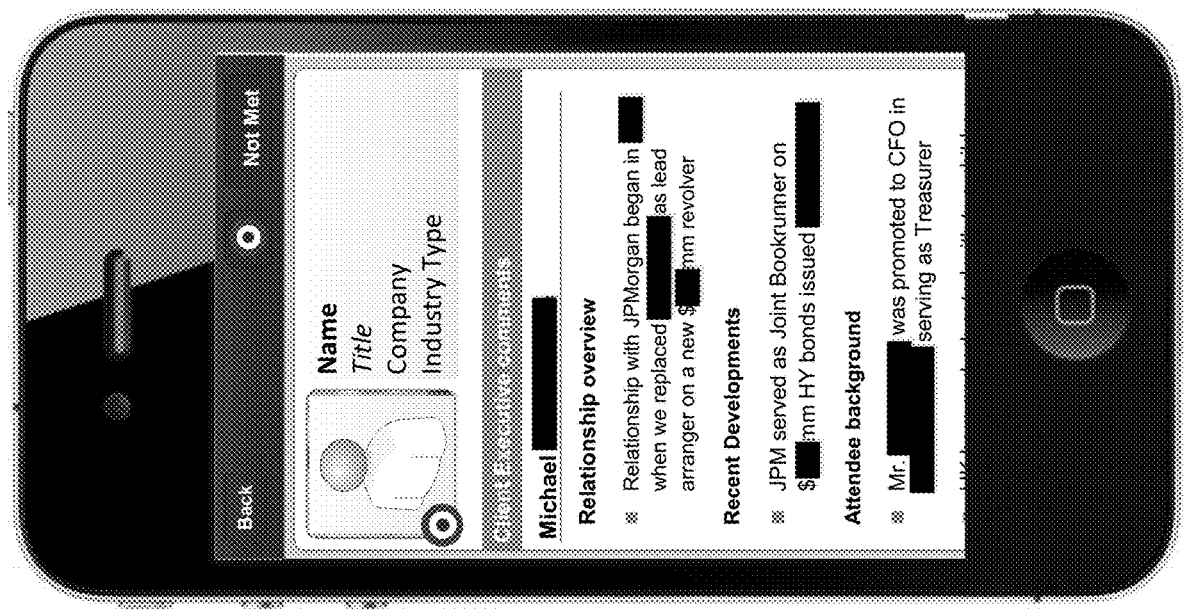

FIG. 9 shows the "Briefing View" with detailed information of a single attendee. In this example, the briefing view includes information about the relationship with the attendee, recent events, and the attendee's background. The briefing view may also include information about the attendee's company, including financial information and a business description. According to one embodiment, the iNetwork App may apply face detection to an attendee's photograph to automatically zoom to the face image for easy browsing.

Figure 10:
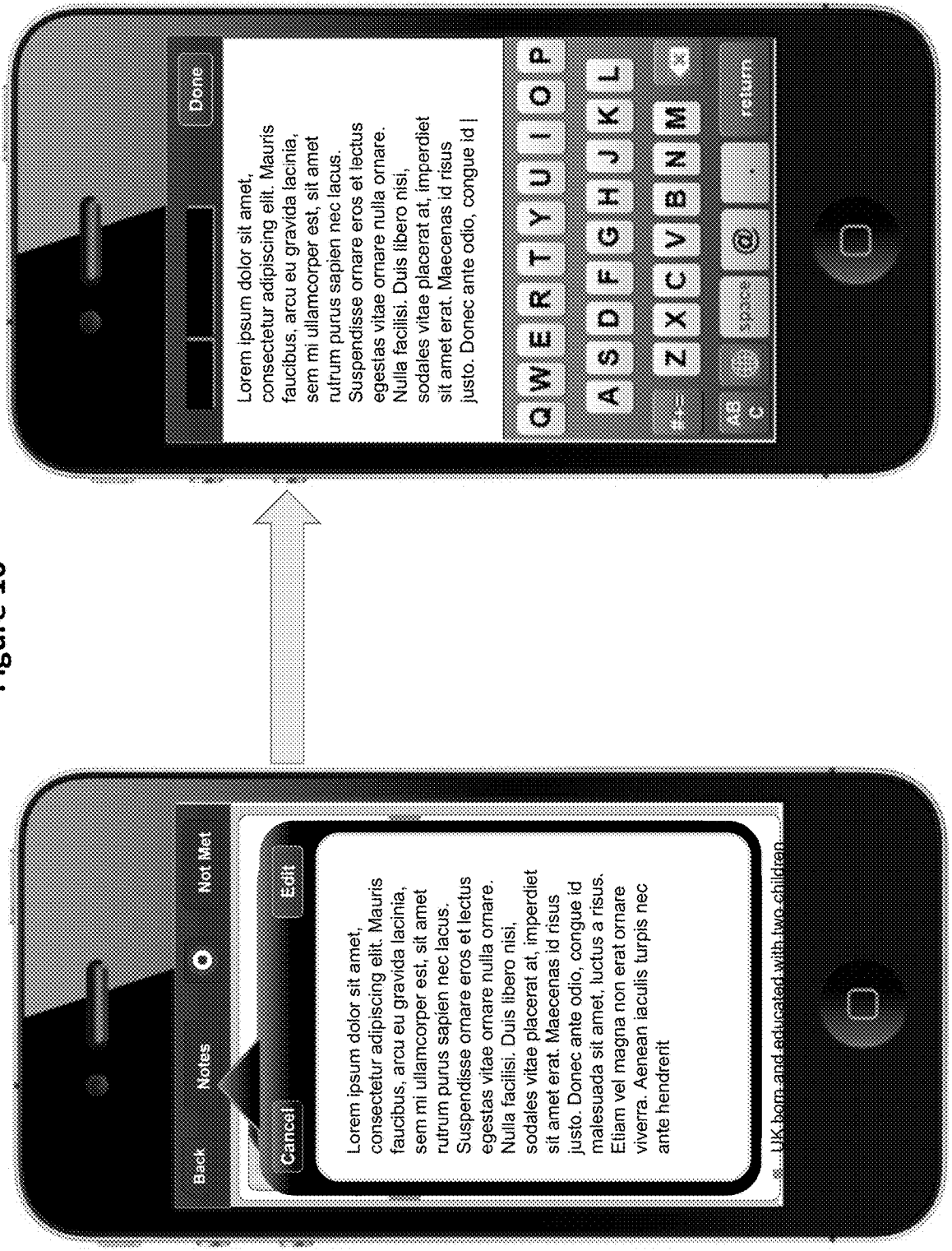

FIG. 10 depicts how the user can engage the iNetwork App to take notes that are associated with a selected attendee in the virtual briefing book file. By pressing the "Notes" button when viewing an attendee profile, the Notes field is displayed and a further press of the "Edit" button provides an on-screen keyboard to facilitate text edits in the Notes field. These notes can then be saved and later uploaded or transmitted back to a central server, such as, for example, a server executing the server-side iNetwork application.

FIG. 11 illustrates how the iNetwork App may allow a user to scroll or swipe to move from one attendee profile to the next attendee profile in the virtual briefing book.

Figure 12:
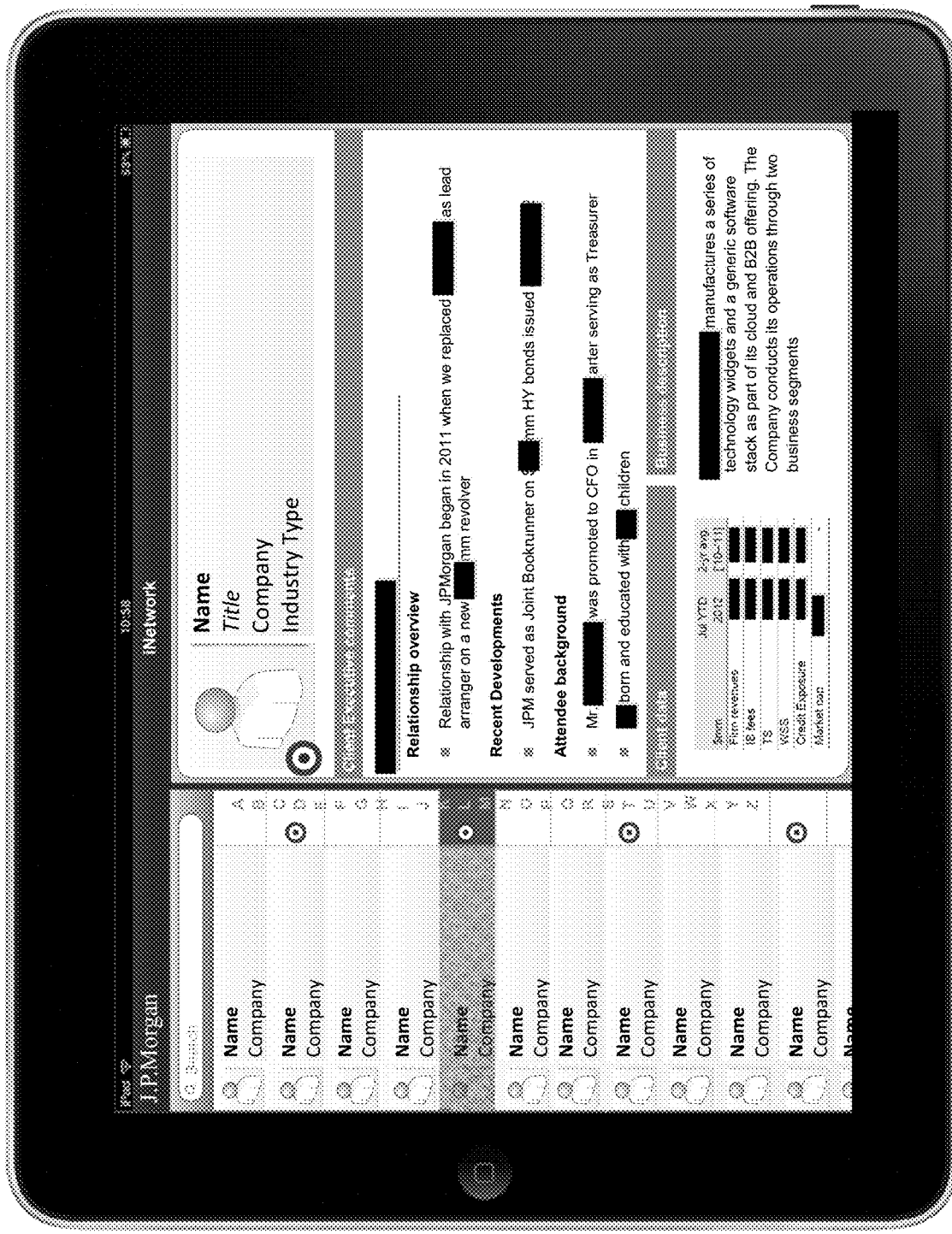
Figure 13:

FIGS. 12-13 illustrate alternative displays that are feasible for the iNetwork App when implemented on an iPad tablet.

Figure 14:
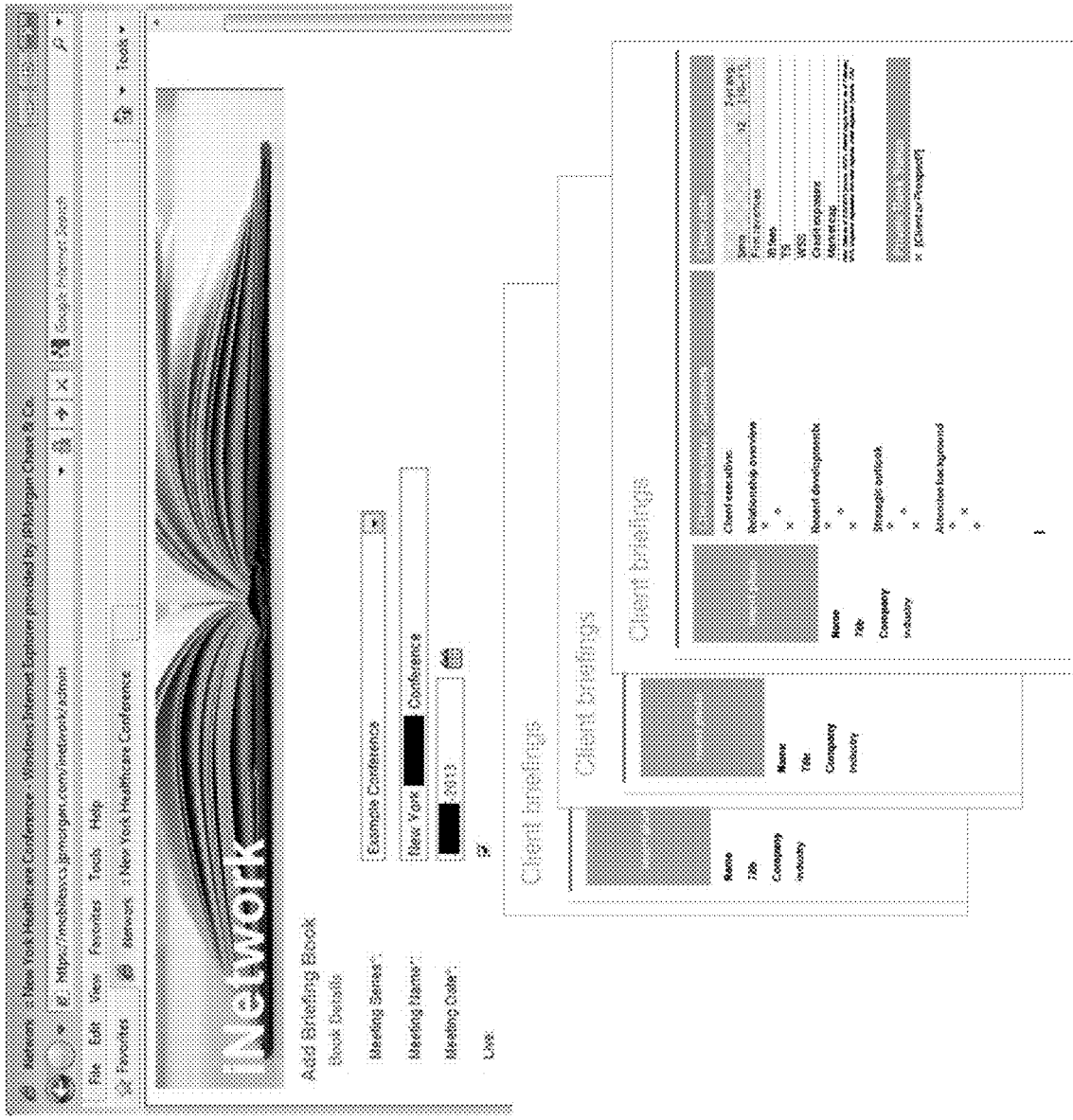
FIGS. 14-15 show exemplary screen shots of a briefing book administrative application according to one embodiment of the invention.
Figure 15:
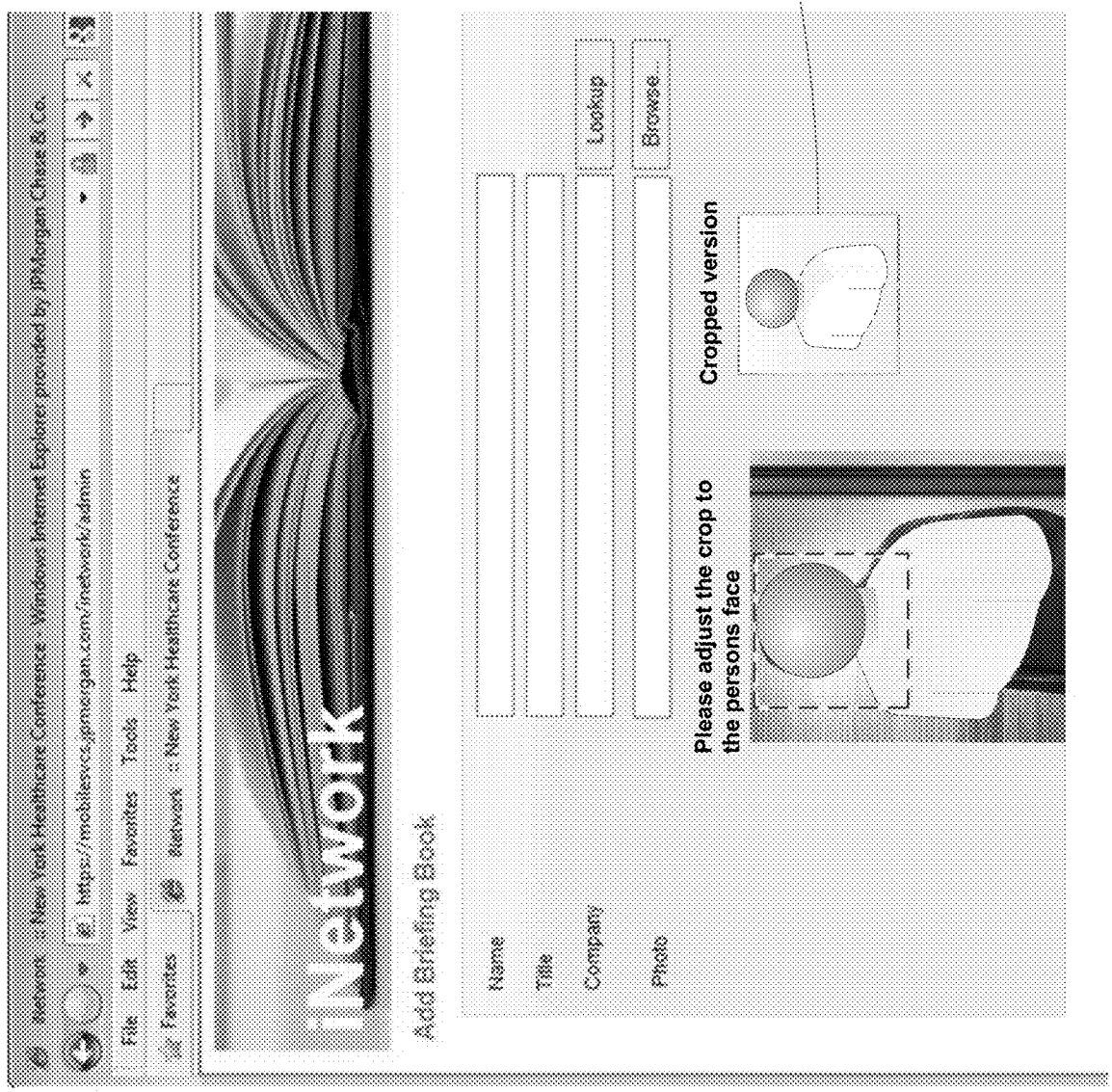

FIGS. 14-15 show exemplary screen shots of a briefing book administrative application according to one embodiment of the invention. The briefing book administrative application is a server-side administrative tool used to create and otherwise administer virtual briefing books. According to one aspect of the invention, a server side iNetwork application performs this function and can further interface with a client-side iNetwork App to deliver updates and receive updates (e.g., annotations). Permission-type security may be employed at any level, for example, at the briefing book level (e.g., security level required to access a briefing book at all) and/or at levels within the briefing book (e.g., different displays or fields within a display may require different security levels). As one example, as shown FIG. 14, comments about an attendee or the attendee's company may have a higher security threshold than basic information, such as the name and title information shown in a list view.

FIG. 15 depicts a cropping tool available in the server-side administrative tool to create pictures use in the virtual briefing books.

Figure 16:
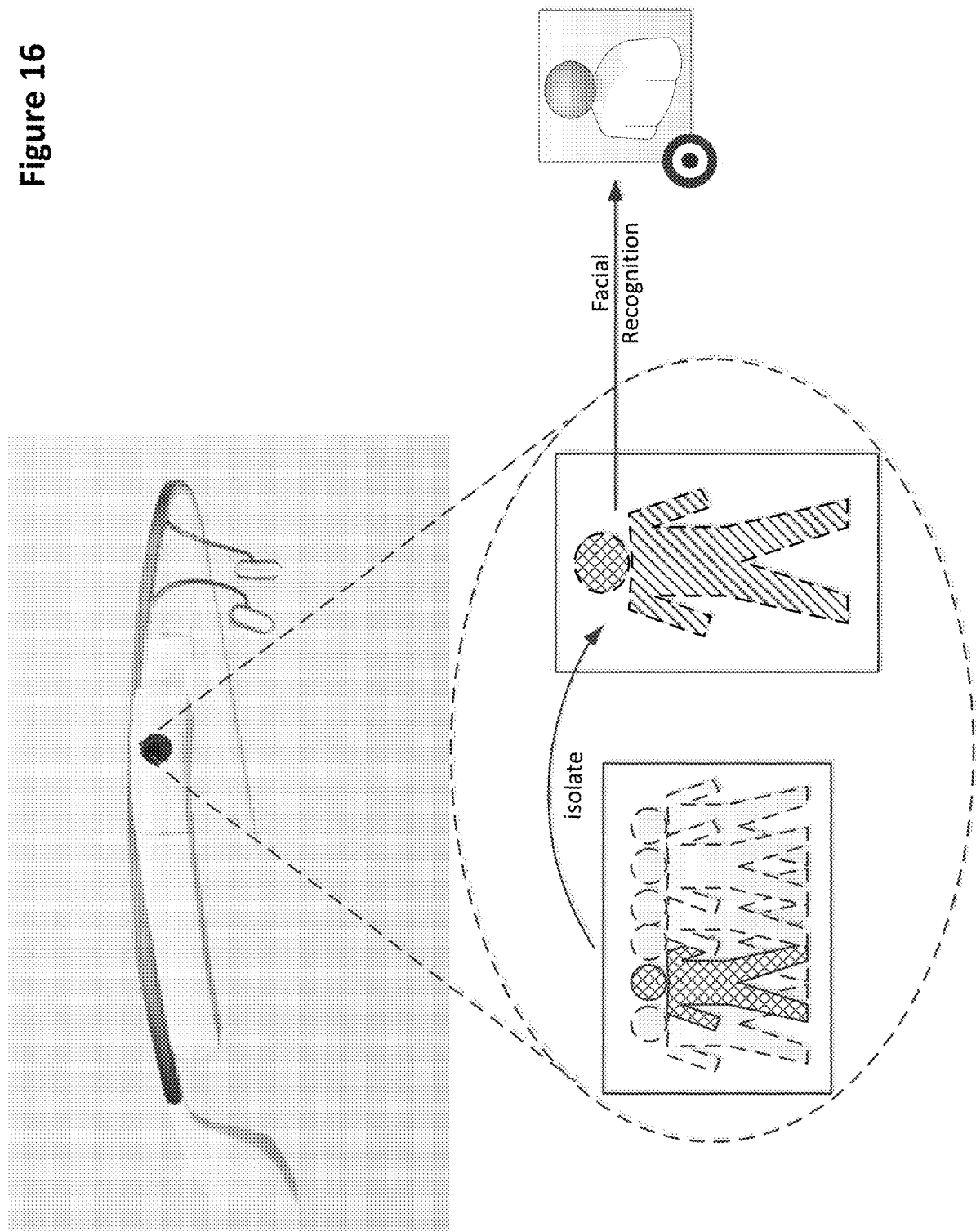
FIG. 16 illustrates an exemplary embodiment of the present invention employing Google Glass technology.

FIG. 16 illustrates an exemplary embodiment of the present invention employing Google Glass technology.

With a virtual briefing book preloaded with attendee photographs, it may still be difficult for a user to quickly locate or recognize a targeted attendee at a live event. This is where facial recognition techniques may come into play. According to some embodiments of the present invention, the portable computing device on which the virtual briefing book is displayed is preferably equipped with at least one camera device. If the user is unsure about an attendee's identity, a snapshot of that attendee could be discreetly taken and then electronically matched with attendee photographs in the briefing book based on a facial recognition algorithm. Alternatively, the image of the attendee could be isolated (e.g., cropped) from a group photo before facial recognition is performed.

Another preferable embodiment could take advantage of the burgeoning Google Glass or similar technology. Google Glass or similar device that can be worn or carried in a manner allowing for real-time or near real-time processing of facial image data in order to perform facial recognition and to retrieve corresponding entries in the virtual briefing book. As illustrated in FIG. 16, a user of the iNetwork App could wear a Google Glass device and take photograph of one or a group of attendees at a conference. Facial recognition may then be run on that photograph to identify one or more attendees. According to one embodiment, the facial recognition may be limited to identify only attendees listed in a briefing book or only targeted attendees. According to another embodiment, the facial recognition may be utilized to a greater extent and also identify attendees not profiled in the briefing book such that new opportunities (e.g., an unexpected but important attendee) could be recognized and taken advantage of Once an attendee is identified, the corresponding profile may be displayed to the user. The Google Glass device may also automatically keep logs of the user's interactions with the attendees.

Using smartphone, tablet, digital camera, and/or Google Glass technologies, the iNetwork App may also quickly identify an attendee and pull up the attendee's profile by applying character recognition on name tags or sensing attendee data from smart name tags (e.g., those equipped with RFID chips or other smart chips). Furthermore, such smart name tags may also be used in connection with the iNetwork App to locate attendees wearing the tags at a conference or other event.

Although embodiments of the present invention have been described so far in the context of conferences or other events and mainly for purposes of business networking, those skilled in the art should appreciate that the invention could have many other practical uses. That is, rather than attendee profiles, the virtual briefing books may include profiles of all kinds of individuals of interest. For example, the virtual briefing book technology could be employed by law enforcement and transportation security personnel to scan crowds and locate wanted individuals. Customs and border control officers may use the iNetwork App with a suitable portable or wearable device to identify an individual and bring up his/her files automatically. Retail and service employees may use the iNetwork App to spot frequent or VIP customers and engage them with custom information in their profiles (e.g., "This new product will go well with the one you bought last time."). By placing profiles of individuals at the fingertips (or in the pocket) of a mobile user, the potential applications of the virtual briefing book technology described herein are almost limitless.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described herein can be made without departing from the spirit and scope of the invention. Accordingly, such modifications are considered within the scope of the invention as intended to be encompassed by the following claims and their legal equivalents.

What is claimed is:

1. A computer-implemented method for delivering a virtual briefing book, comprising:
    storing at a server in an non-transitory computer memory a briefing book administrative application that upon execution performs the following operations:
        accepting an input of information describing one or more selected attendees of a conference, seminar, or other event,
        accessing a single briefing book file that is customized for the conference, seminar, or other event by including identification and at least one photograph of each of the one or more selected attendees, and
        downloading the briefing book file to at least one portable computing device;

providing for storage at a portable computing device in a non-transitory computer memory a dedicated briefing book client application that upon execution performs the following operations:

displaying at least one briefing book file that has been downloaded to the portable computing device, providing information in the portable computing device that automatically identifies and tracks a location of at least one of the one or more selected attendees in the briefing book at the conference, seminar, or other event based on an interaction with RFID and GPS in at least one intelligent name tag device assigned to the at least one of the one or more selected attendees, when a contact is made with the at least one of the one or more selected attendees for which information has been provided based on the interaction with RFID and GPS, accepting user input to change a status of the at least one of the one or more selected attendees from a target status to a contact-made status and to annotate an attendee profile of the at least one of the one or more selected attendees based on the contact, accepting user inputs to view or manipulate information of attendees including the at least one photograph in the at least one briefing book file, modifying, within the dedicated briefing book client application, at least a portion of the at least one briefing book file or the attendee profile based on at least one user input, and uploading, to the server, an updated version of the at least one briefing book file or an updated version of the attendee profile as part of the at least one briefing book file.

2. The computer-implemented method of claim 1, wherein the briefing book file includes thumbnail type photos of attendees.

3. The computer-implemented method of claim 1, wherein the briefing book client application delivers a plurality of different user interface displays of attendee information.

4. The computer-implemented method of claim 1, wherein the downloaded briefing book file can be annotated by a user of the briefing book client application, and wherein the annotated briefing book file can be uploaded back to the server.

5. The computer-implemented method of claim 4, wherein upon execution the briefing book administrative application further performs the operation of marking selected attendees as targets based on a user annotation.

6. The computer-implemented method of claim 1, wherein upon execution the briefing book client application further performs facial recognition to match in-situ images with photographs previously stored in the at least one briefing book file.

7. The computer-implemented method of claim 1, wherein upon execution the briefing book administrative application accepts at least one user input assigning a security access level to at least a portion of the briefing book file.

8. The computer-implemented method of claim 1, wherein upon execution the briefing book client application automatically updates the at least one briefing book file on the portable computing device with information received in real-time from a networked source.

9. The computer-implemented method of claim 1, wherein the briefing book client application when executed receives input from Internet display glasses or goggles worn by a user.

10. A non-transitory computer readable medium having code implementing a virtual briefing book client application, the code executable by a portable computing device to perform the following:

storing at least one briefing book file, each of the at least one briefing book file being customized for a conference, seminar, or other event by containing at least one attendee profile describing one or more selected attendees of the conference, seminar, or other event, the at least one briefing book file comprising identification and at least one photograph of each of the one or more selected attendees;

displaying a selected one of the at least one briefing book file by listing attendees described in the selected briefing book file on a graphical user interface of the portable computing device;

providing information in the portable computing device that automatically identifies and tracks a location of at least one of the one or more selected attendees in the briefing book at the conference, seminar, or other event based on an interaction with RFID and GPS in at least one intelligent name tag device assigned to the at least one of the attendees;

when a contact is made with the at least one of the one or more selected attendees for which information has been provided based on the interaction with RFID and GPS, accepting user input to change a status of the at least one of the attendees from a target status to a contact-made status and to annotate an attendee profile of the at least one of the attendees based on the contact;

receiving a first input from a user to mark a status of a first selected attendee as a target;

displaying an indicia of the status on the graphical user interface in connection with the first selected attendee;

receiving a second input from the user to annotate a second selected attendee within the virtual briefing book client application;

storing the second input in connection with the second selected attendee in the selected briefing book file; and uploading, to a computer server, an updated version of the selected briefing book file or an updated version of an attendee profile as part of the selected briefing book file.

11. The computer readable medium of claim 10, wherein the at least one photograph of each attendee comprises a thumbnail photograph image.

12. The computer readable medium of claim 10, wherein the code is further configured to deliver a plurality of different user interface displays of attendee information.

13. The computer readable medium of claim 10, wherein the code is further configured to upload an annotated briefing book file to a server.

14. The computer readable medium of claim 10, wherein the code is further configured to perform facial recognition to match in-situ images with photographs previously stored in the selected briefing book file.

15. The computer readable medium of claim 10, wherein the code is further configured to accept at least one user input assigning a security access level to at least a portion of the selected briefing book file.

16. The computer readable medium of claim 10, wherein the code is further configured to receive input from Internet display glasses or goggles worn by a user.

17. The computer readable medium of claim 10, wherein the code is further configured to automatically update the selected briefing book file on portable computing device with information received in real-time from a networked source.

18. The computer readable medium of claim 17, wherein the networked source is selected from a group consisting of: a social media website, a news database, a market database, and a private database.

19. A computer-implemented system for delivering a virtual briefing book, comprising:

at least one computer server adapted to:

accept an input of information describing one or more selected attendees of a conference, seminar, or other event, access a single briefing book file that is customized for the conference, seminar, or other event by including identification and at least one photograph of each of the one or more selected attendees, and download the briefing book file to at least one portable computing device with a dedicated briefing book client application that upon execution performs the following operations:

display at least one briefing book file that has been downloaded to the portable computing device, accept user inputs to view or manipulate information of attendees including the at least one photograph in the at least one briefing book file, provide information in the portable computing device that automatically identifies and tracks a location of at least one of the one or more selected attendees in the briefing book at the conference, seminar, or other event based on an interaction with RFID and GPS in at least one intelligent name tag device assigned to the at least one of the attendees;

when a contact is made with the at least one of the one or more selected attendees for which information has been provided based on the interaction with RFID and GPS, accept user input to change a status of the at least one of the attendees from a target status to a contact-made status and to annotate an attendee profile of the at least one of the one or more selected attendees based on the contact, modify, within the dedicated briefing book client application, at least a portion of the at least one briefing book file or an attendee profile based on at least one user input, and upload, to the at least one server, an updated version of the at least one briefing book file or an updated version of an attendee profile as part of the at least one briefing book file.

* * * * *